Sept. 15, 1964 A. BLASS 3,148,704
COMBINATION OR BRANCH VALVE
Filed Sept. 26, 1962 3 Sheets-Sheet 1
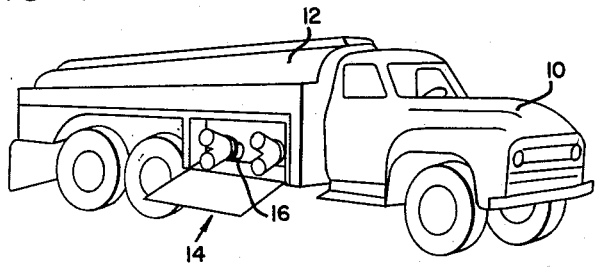
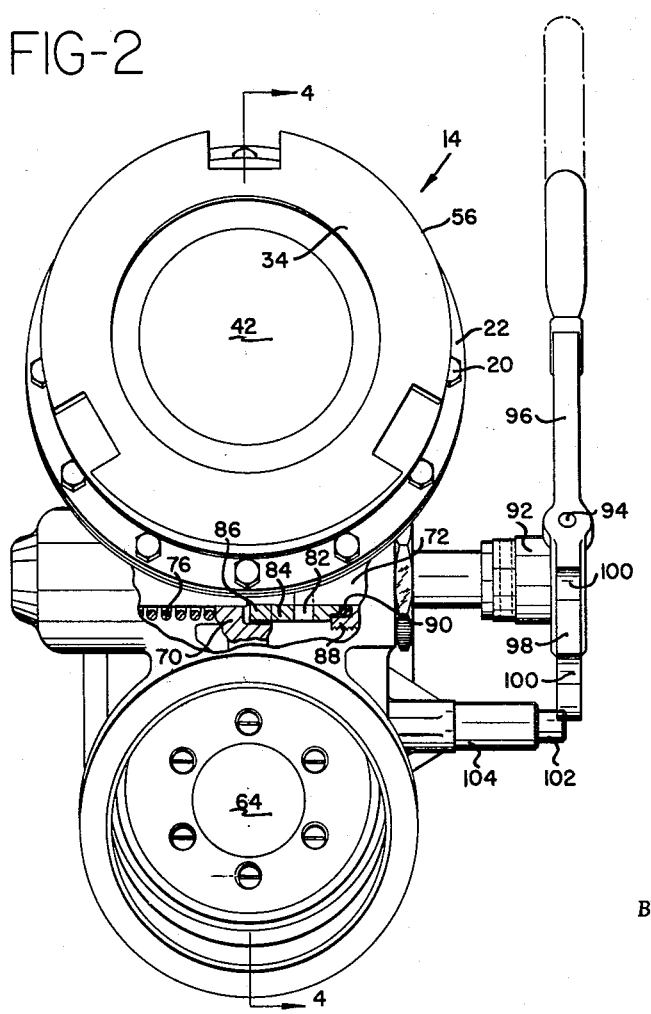
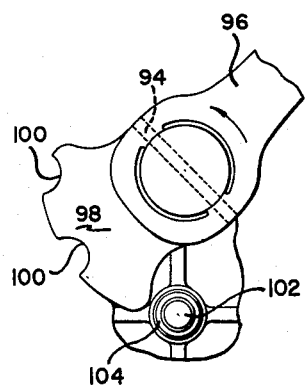
INVENTOR.
ADOLF BLASS
BY *Toulmin & Toulmin*
ATTORNEYS

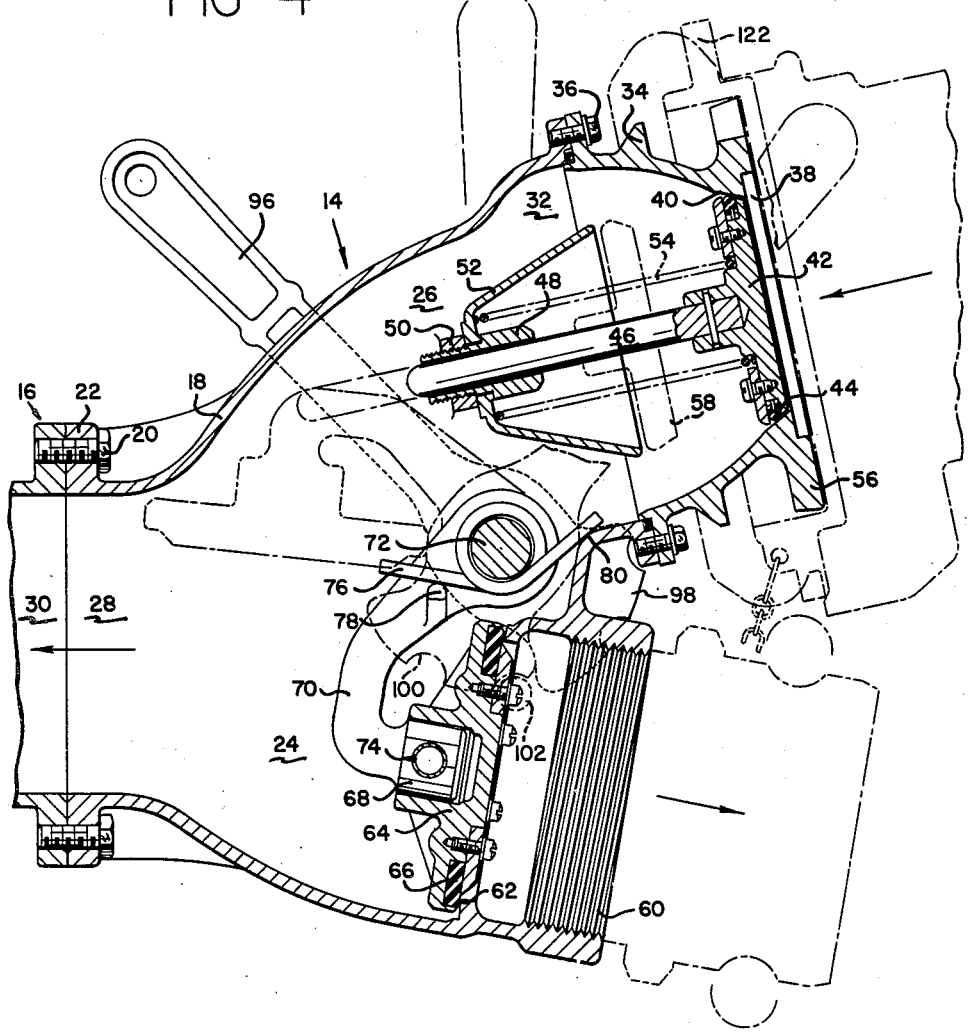

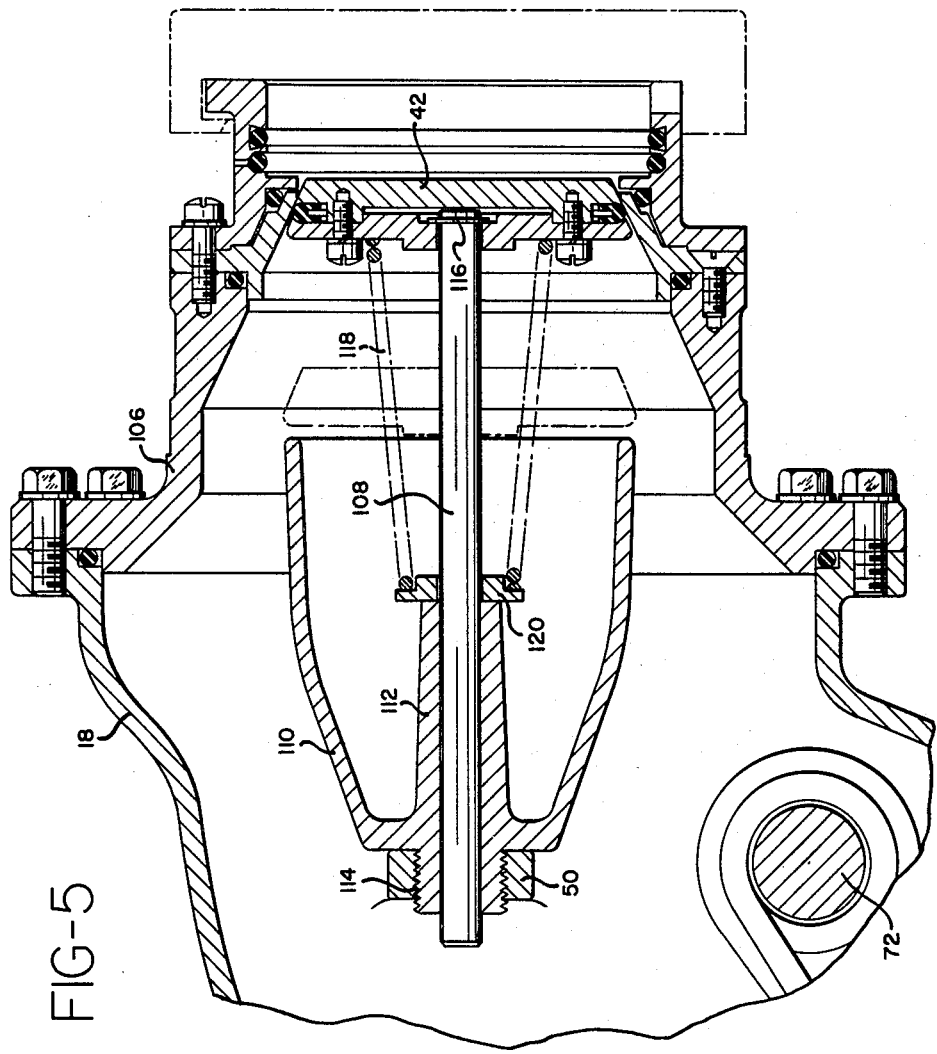

United States Patent Office 3,148,704
Patented Sept. 15, 1964

3,148,704
COMBINATION OR BRANCH VALVE
Adolf Blass, Dayton, Ohio, assignor to Buckeye Iron &
Brass Works, Dayton, Ohio, a corporation of Ohio
Filed Sept. 26, 1962, Ser. No. 226,315
2 Claims. (Cl. 137—612.1)

The present invention relates to valves and is particularly concerned with a combination valve arrangement especially adapted for use in connection with fuel conveying vehicles, such as tank trucks or the like.

Tank trucks are well known and are widely used for the conveying of fuels as, for example, from a supply depot to individual refueling stations for automobiles, trucks, and aircraft.

A great many trucks of this nature are of the type that are filled through the top while the fuel is delivered from a valve arrangement in the bottom. Developments in this field have tended toward filling of the trucks from the bottom and under pressure to obtain faster filling and also to eliminate the expensive and troublesome top filling openings on the tank trucks. New tank trucks can readily be manufactured to meet these requirements but, with existing tank trucks, certain problems are encountered in adapting them to bottom filling operations.

These problems involve the removal of the trucks from service during the conversion which is undesirable on account of the loss of working time of the truck. Also, to place a bottom filling valve on a truck that has a top filling opening, it usually requires that the tank of the truck be cut at the bottom and a suitable fitting welded therein to receive the bottom filling valve. This is not only expensive, but is also a hazardous operation unless considerable time is taken to purge the truck of explosive of inflammable residues.

With the foregoing in mind, the present invention proposes the provision of a special combination fill and discharge valve embodied in a single unit which can be placed on either existing tank trucks or new tank trucks without cutting and welding and without a great deal of time being expended in mounting the valve on the truck.

The present invention also proposes the provision of a dual valve arrangement for fuel conveying tank trucks in which two completely operative valves are provided without either thereof interfering with the operation of the other while employing a single valve body therefor and a single point of connection to the truck.

The exact nature of the present invention will be more fully understood upon reference to the following specification, taken in connection with the accompanying drawings, in which:

FIGURE 1 is a perspective view of a tank truck of the nature with which a valve unit of the present invention is usable;

FIGURE 2 is an end view of the combination valve partly broken away to show a part of the integral construction thereof;

FIGURE 3 is a fragmentary side elevational view showing an operating lever for the member of one of the valve portions of the valve unit and a cooperating arrangement for latching the operating lever in its various positions;

FIGURE 4 is a longtudinal sectional view through the valve unit and is indicated by line 4—4 on FIGURE 2; and FIGURE 5 is a fragmentary view showing a modified arrangement of that portion of the valve unit which forms an inlet to the fill valve portion of the valve unit.

Referring to the drawings somewhat more in detail, the tank truck shown in FIGURE 1 comprises a tractor portion 10 and a tank portion 12. The tank portion at the underneath side has a valve unit 14 according to the present invention which is preferably mounted in a compartment having a door so that the valve is enclosed during transport, but access thereof can be had for filling and emptying of the tank.

The tank preferably comprises an elbow or a like fitting 16 on the bottom to which the valve unit is secured as by flange mounting.

FIGURES 2, 3 and 4 show the valve unit 14 in more detail. In these views, it will be noted that the valve unit comprises a body 18 secured to fitting 16 by bolts 20 passing through the flange means 22 of the valve body.

The valve unit comprises a branched flow passage with one flow passage 24 representing the discharge passage and another flow passage 26 representing the fill passage. These passages join in a single port 28 that communicates with passage 30 in fitting 16.

The fill passage of the valve unit terminates in a port 32 and secured to the valve body in closing relation to the port 32 is an adapter member 34 held in place by cap screws 36. This adapter member, in turn, has a discharge port 38 adjacent which is a valve seat 40 adapted for sealing engagement by a valve disc 42 that carries an annular seal assembly 44 for sealingly engaging valve seat 40.

Pinned to the valve disc 42 is a valve stem 46 extending into the valve body and being reciprocably received in a guide 48 threaded into the hub 50 of a spider or bridge integral with the valve body.

The guide 48 also clamps to hub 50 a cone 52 that forms with the valve disc 42 when the latter is open a passage extending through the valve body which does not change materially in cross sectional area thereby tending to eliminate excessive turbulence within the valve body and radical pressure changes in the fluid flowing therethrough.

The cone 52 also provides a seat for a spring 54 which bears at its other end on the back side of valve disc 42 so that the valve disc is normally urged into closed position.

As is known in this art, when a filling nozzle is attached to adapter member 34 by engaging the slotted flange portion 56 of the adapter member, opening of the nozzle will simultaneously cause movement of the valve disc 42 to its dot-dash position 58 so that fluid can be passed through the fill passage 56 and to the tank. When the filling nozzle is closed, spring 54 will close valve disc 42 on its seat.

The discharge passage 24 of the valve unit 14 may terminate in a threaded port 60 and inwardly of the valve body therefrom is a seat 62 adapted for engagement by a valve member 64 that carries an annular sealing disc 66 engageable with seat 62 when the valve disc is closed.

Valve member 64 has a socket on the back side that receives the end 68 of an angular lever 70 that is fixed to a shaft 72. A roll pin 74 can be employed for fixing the end portion 68 of the lever to the valve member.

Lever 70 is rotatable on shaft 72 and is biased by a torsion spring 76 in a direction to close valve member 64. Torsion spring 76 surrounds shaft 72 and has one portion pinned on a lug 78 integral with lever 70 while the other end bears on the side of the valve body at 80.

Turning now to FIGURE 2, it will be seen that shaft 72 has pinned thereto by pin 82 a drive bushing 84. Drive bushing 84 has a non-circular end part 86 fitting into a correspondingly shaped socket on the portion of lever 70 that surrounds shaft 72. The aforementioned torsion spring 76 also acts as a compression spring and holds lever 70 in its FIGURE 3 position with reference to the axial direction of shaft 72.

This also holds shaft 72 and drive bushing 84 in engagement with the inner end of nut 88 threaded into the side of the valve body. This nut is larger in diameter than drive bushing 84 so that upon removing the nut, the shaft 72 and drive bushing 84 can be removed from the valve body. A seal ring 90 is disposed between the end of drive bushing 84 and the inner end of nut 88 and this seals against leakage from the valve body.

The diameter of nut 88 is larger than that of the drive bushing and when the nut is removed, the valve disc 64, lever 70, and spring 76 can be removed from or inserted into the valve body through port 28 or through port 32 with the adapter 34 removed.

Externally of the valve body, shaft 72 has pinned thereto a lever hub 92 to which is pivoted by a pin 94 an operating lever 96. Operating lever 96 has a swinging portion 98 provided with notches 100 adapted for engagement with a pin 102 carried in a boss 104 formed on the valve body. By rotating the lever about pin 94 swinging portion 98 can be disengaged from pin 102 and moved to the desired position and then swung backwardly at which time pin 102 will engage one of the notches 100 and lock the lever and parts connected thereto in the particular adjusted position.

FIGURE 5 shows a somewhat modified arrangement to which the valve body 18 has secured thereto a modified adapter 106 adapted for receiving a different type filling nozzle than adapter 34.

The adapter 106 is somewhat longer in the longitudinal direction than adapter 34 and this requires a longer valve stem 108 on valve disc 42. In this modification, the cone portion 110 provides the guide means 112 for the valve stem and the cone itself is threaded at 114 into the hub 50 of the valve body.

Whereas the valve stem 46 of the first modification is pinned to valve disc 42, stem 108 of the FIGURE 5 modification is held in place on the valve disc by a snap ring 116 which provides for some freedom of movement of the valve disc relative to the stem.

A compression spring 118 is provided bearing between the back of the valve disc and a washer or the like at 120 surrounding the valve stem and abutting the valve guide portion 112 of cone 110.

The valve of the present invention, as mentioned before, is a unitary device so that in converting a tank truck from top fill and bottom unload operations to bottom fill and bottom unload, it is only necessary to remove the unloading valve with which the tank is fitted and replace it with the combination valve of the present invention. This greatly simplifies the conversion of existing trucks and, at the same time, a simple relatively inexpensive unit is provided that is adapted for incorporation in new manufacture.

It will be understood that the exposed ports of the valves could be provided with dust caps such as indicated in dot-dash outline in FIGURES 4 and 5 and that both of the outer ports of the valve unit are so arranged relative to each other that it is a relatively simple matter to make connections thereto of filling nozzles and discharge hoses.

It will be understood that this invention is susceptible to modification in order to adapt it to different usages and conditions and, accordingly, it is desired to comprehend such modifications within this invention as may fall within the scope of the appended claims.

I claim:

1. A valve body for tanks and tank trucks to provide a bottom filling and discharging dual valve arrangement, said valve body comprising first, second and third ports and flow passage means interconnecting said ports, means for connecting said valve body to a tank with said first port in fluid communication with said tank, a check valve member in said valve body operatively associated with said second port and normally closing said second port and movable inwardly from said second port to permit fluid flow into said valve body and through said passage means to said first port, a valve disc in said valve body associated with said third port for selectively opening and closing said third port, and lever means movably mounted on said valve body and operatively connected with said valve disc for moving the valve disc between open and closed position, said operative connection including a shaft extending through said valve body, and a lever arm in said valve body having one end journalled on said shaft and the other end secured to said valve disc and operating to move said valve disc between said open and closed positions, said last-mentioned lever arm and valve disc being mounted to swing into the second flow passage when said valve disc is moved to open position.

2. The invention as defined in claim 1, wherein said shaft is positioned in said valve body between said second and third flow passages and wherein said lever arm in said valve body is angular.

References Cited in the file of this patent

UNITED STATES PATENTS

| | | |
|---|---|---|
| 1,146,558 | Fenton | July 13, 1915 |
| 1,971,450 | Heitmuller | Aug. 28, 1934 |
| 2,512,052 | Brown | June 20, 1950 |
| 2,588,869 | Pinaire | Mar. 11, 1952 |
| 2,733,835 | Alfery | Feb. 6, 1956 |
| 2,905,486 | Goodin | Sept. 22, 1959 |
| 2,957,504 | Botkin | Oct. 25, 1960 |

FOREIGN PATENTS

| | | |
|---|---|---|
| 716,862 | Germany | Jan. 30, 1942 |